(12) United States Patent
Jackson

(10) Patent No.: US 10,029,721 B2
(45) Date of Patent: Jul. 24, 2018

(54) HYDRATION CART

(71) Applicant: Jeffrey K. Jackson, Salt Lake City, UT (US)

(72) Inventor: Jeffrey K. Jackson, Salt Lake City, UT (US)

( * ) Notice: Subject to any disclaimer, the term of this patent is extended or adjusted under 35 U.S.C. 154(b) by 0 days.

(21) Appl. No.: 15/632,344

(22) Filed: Jun. 24, 2017

(65) Prior Publication Data
US 2018/0009457 A1    Jan. 11, 2018

Related U.S. Application Data

(60) Provisional application No. 62/354,114, filed on Jun. 24, 2016.

(51) Int. Cl.
*B62B 3/10* (2006.01)

(52) U.S. Cl.
CPC ............ *B62B 3/10* (2013.01); *B62B 2202/20* (2013.01); *B62B 2501/06* (2013.01)

(58) Field of Classification Search
CPC ........... B62B 3/10; B62B 3/002–3/004; B62B 2202/20; B62B 2202/40
See application file for complete search history.

(56) References Cited

U.S. PATENT DOCUMENTS

| | | | | |
|---|---|---|---|---|
| 1,772,111 A * | 8/1930 | Rice | ........................ | B67D 1/06 222/108 |
| 1,979,549 A * | 11/1934 | Huckel | .................... | F25D 3/06 222/130 |
| 3,232,489 A * | 2/1966 | Buffington | ............... | B67D 1/06 211/150 |
| 3,677,173 A * | 7/1972 | Fogle, Jr. | ............... | A47B 31/02 126/37 R |
| 4,308,975 A * | 1/1982 | Bowen | .................... | B67D 1/04 222/146.6 |
| 5,154,317 A * | 10/1992 | Roppolo, III | ........... | B05B 9/007 222/331 |
| 5,626,353 A * | 5/1997 | Campbell | ............... | A47B 31/02 280/47.35 |
| 6,047,866 A * | 4/2000 | Brown | .................... | B05B 9/007 222/481 |
| 7,168,599 B1 * | 1/2007 | Criswell | ................. | B62B 1/264 222/142.3 |
| 7,757,908 B1 * | 7/2010 | Buhl, Jr. | ............... | B67D 1/0406 141/231 |
| 7,909,148 B1 * | 3/2011 | Miller | ...................... | A45C 9/00 190/11 |
| D778,662 S * | 2/2017 | Gannon | ........................ | D34/14 |
| 9,681,638 B1 * | 6/2017 | Harris | ...................... | A01K 1/01 |

(Continued)

OTHER PUBLICATIONS

Powerade Sideline Cart Adjustable Height, Accessed Dec. 19, 2017, pp. 1-2.

(Continued)

*Primary Examiner* — Erez Gurari

(57) ABSTRACT

A cart for the management of liquids, trash, and equipment during indoor events is disclosed. The cart may have a raised lip circumscribing a portion of a top surface below a liquid dispensing device such that spilled liquids are contained. The top surface may comprise a slight slope that directs spilled liquid into an appropriate receptacle for storage and later clean up.

19 Claims, 4 Drawing Sheets

(56) References Cited

U.S. PATENT DOCUMENTS

| | | | |
|---|---|---|---|
| 2002/0047251 A1* | 4/2002 | Simmons | B62B 1/147 280/659 |
| 2005/0011037 A1* | 1/2005 | Zhao | A47L 9/009 15/323 |
| 2006/0102231 A1* | 5/2006 | Schiller | B62B 3/10 137/355.12 |
| 2007/0182113 A1* | 8/2007 | McCutchen | A01K 97/22 280/47.35 |
| 2007/0182114 A1* | 8/2007 | Fernandes | B25H 3/00 280/47.35 |
| 2007/0267832 A1* | 11/2007 | Denissov | A47L 9/0009 280/47.35 |
| 2009/0309321 A1* | 12/2009 | Sukey | B62B 3/10 280/29 |
| 2011/0309591 A1* | 12/2011 | Petrick | H01R 13/465 280/47.35 |
| 2014/0375004 A1* | 12/2014 | Adams | A47L 13/51 280/47.35 |
| 2015/0166089 A1* | 6/2015 | Rupp | A23G 9/00 280/651 |
| 2015/0344176 A1* | 12/2015 | Seibold | E03B 11/02 220/4.16 |
| 2016/0121914 A1* | 5/2016 | Fodrocy | B62B 3/004 280/47.34 |
| 2016/0347598 A1* | 12/2016 | Gannon | B67D 1/0857 |
| 2017/0327141 A1* | 11/2017 | Thuma | B62B 5/0006 |
| 2017/0340105 A1* | 11/2017 | Knighton | A47B 31/00 |

OTHER PUBLICATIONS

Gatorade Cooler Stand for 3,5,7 & 10-Gallon Cooler, Accessed Dec. 19, 2017, pp. 1-2.

Water Cooler Cart, Accessed Dec. 19, 2017, pp. 1-2.

* cited by examiner

US 10,029,721 B2

HYDRATION CART

FIELD OF THE INVENTION

The present invention relates to a novel device for the management of liquids, trash and equipment during indoor events. More particularly, the invention relates to a device which contains and organizes liquids, trash, and equipment while preventing theft or spillage.

BACKGROUND

Indoor events are a staple of many popular sports. All indoor sporting events require hydration, specialized athletic equipment, and trash collection in support of the competing athletes. There are many ad hoc solutions for the management of liquids, trash, and sporting equipment, but there are no consolidated solutions which provide security, organization, and spill prevention in one package.

Athletic trainers currently utilize open sided carts for the dispensing of liquids. These carts sometimes possess a small shelf, below the liquid container, for the storage of equipment and or trash.

Current solutions do not contain design features for the retention of spilled liquid. They are also non-lockable and do not protect against disorganization or potential thefts from foreign parties.

Another drawback is that many current carts are too large for use in the tight confines of indoor sporting events. These size requirements pertain to height, for sightlines, and 360 degree access radius.

Therefore, a need exists in the field for novel consolidated devices and apparatuses capable of maneuvering in the confines of an indoor environment, containing spillage of liquids and trash, organizing and securing equipment, enabling easy mobility, and allowing for compatibility with common liquid and trash containers.

BRIEF SUMMARY OF THE INVENTION

The present invention comprises a novel utility cart for the management of liquids, trash, and equipment during indoor events. The utility cart may have a raised lip covering a portion of the enclosed top surface below the liquid dispensing device such that spilled liquids are contained. This enclosed top surface may also contain a slight slope; thereby directing said spilled liquid into an appropriate receptacle for storage and later clean up. The outside edge of the raised lip could also be covered with a protective material to serve as a bumper.

The enclosed top surface may have a form of pedestal, which would serve to retain and elevate common liquid containers to a height such that common cups, bottles, and containers could be placed appropriately for the dispensing of liquids. This pedestal can also be designed for modularity in that it can be adjusted for the height and diameter of various liquid containers as desired.

Below the enclosed top surface could reside a receptacle for the collection of liquids and trash directly in line with the low point of the enclosed surface and a hole through the enclosed surface. This receptacle could also reside on flanges, rails, slides, or hinges for easy removal for emptying.

The area below the enclosed surface could also have locking doors to create a secure area for storage of equipment. These doors could also split in the middle for a reduced swing radius in a confined environment. The doors could either swing around to adhere to the side of the cart, slide back in to a false wall divider, retract below like an upside down single or upside down roll top.

BRIEF DESCRIPTION OF THE DRAWINGS

Some embodiments of the present invention are illustrated as an example and are not limited by the figures of the accompanying drawings, in which like references may indicate similar elements in which.

DETAILED DESCRIPTION OF THE DRAWINGS

Figure 1:
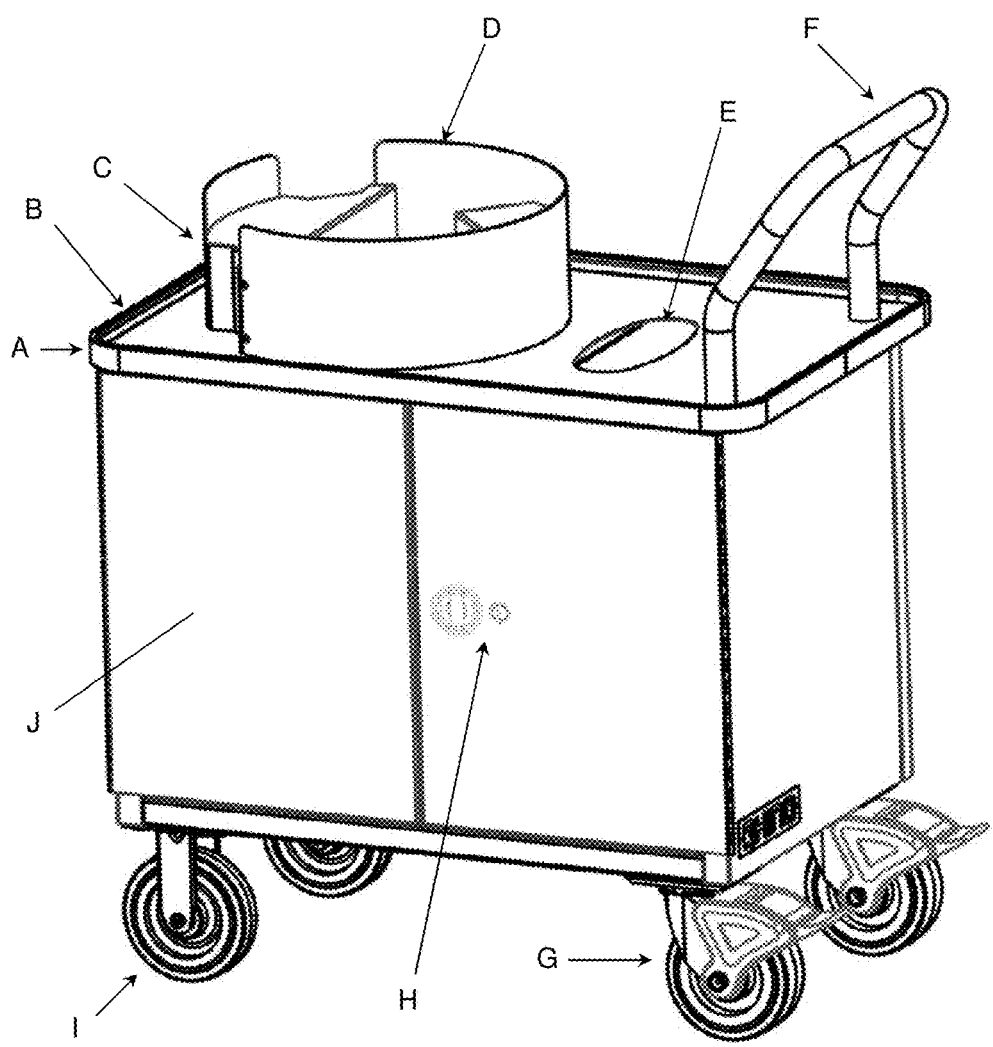
FIG. 1 shows a perspective view of the utility cart.

FIG. 1 shows a perspective view of the utility cart which demonstrates a potential placement for the:

A—Bumper;
B—Lip to prevent spillage;
C—Accommodation for the placement of common liquid containers;
D—Pedestal for the elevation of liquid dispensers above the enclosed top surface, which can be modular and allow for changes in orientation, pitch, and height for use with different bottles, cups and containers;
E—Hole at the low point of the inclined enclosed top surface for the collection of liquids and trash;
F—Handle for mobility and control;
G—360 degree swivel casters with brakes located below handle for increase mobility and control;
H—Locking device for the securing of one or multiple portions of the lower compartment;
I—Fixed fork wheels for controllability when turning, on inclines, and level surfaces at higher speed; and
J—Short radius doors for the securing of equipment and use in confined spaces.

Figure 2:
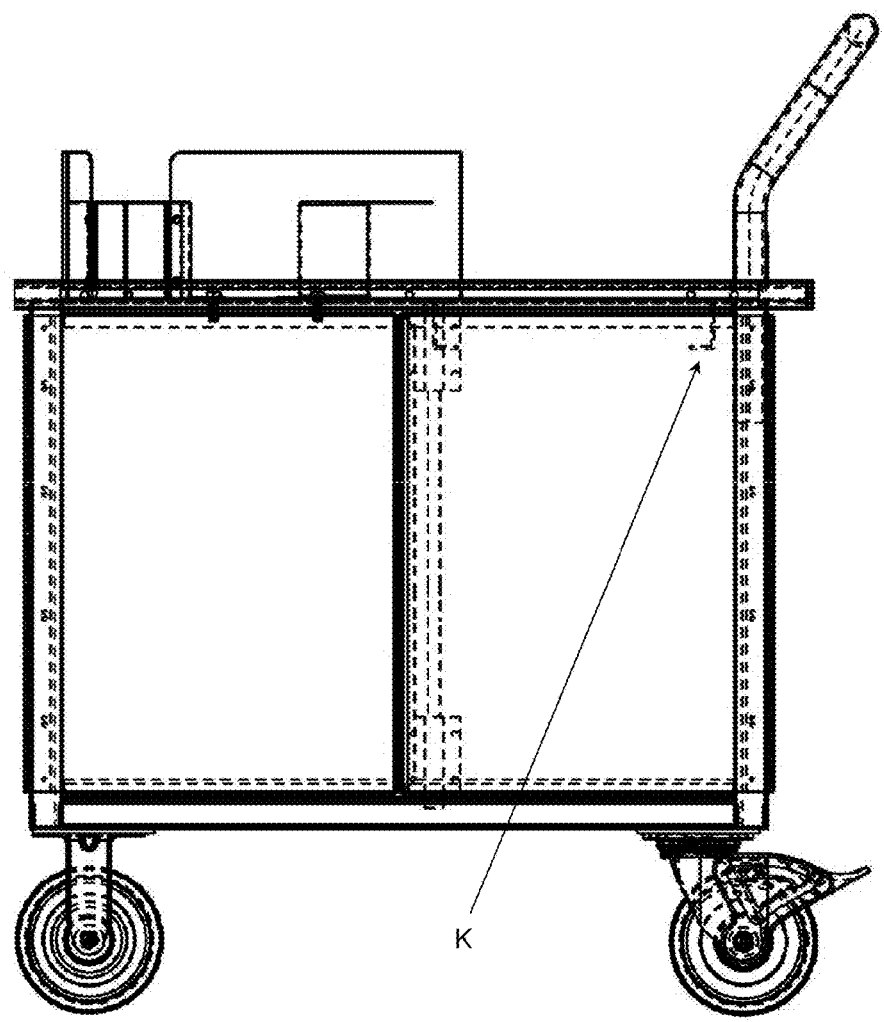
FIG. 2 shows a front view of the utility cart.

FIG. 2 shows a front view of the utility cart which demonstrates a potential placement for the flange, lip, or slide hinge (K) which enables easy removal and install of the trash and liquid receptacle placed under the hole at the low point of the inclined enclosed top surface.

Figure 3:
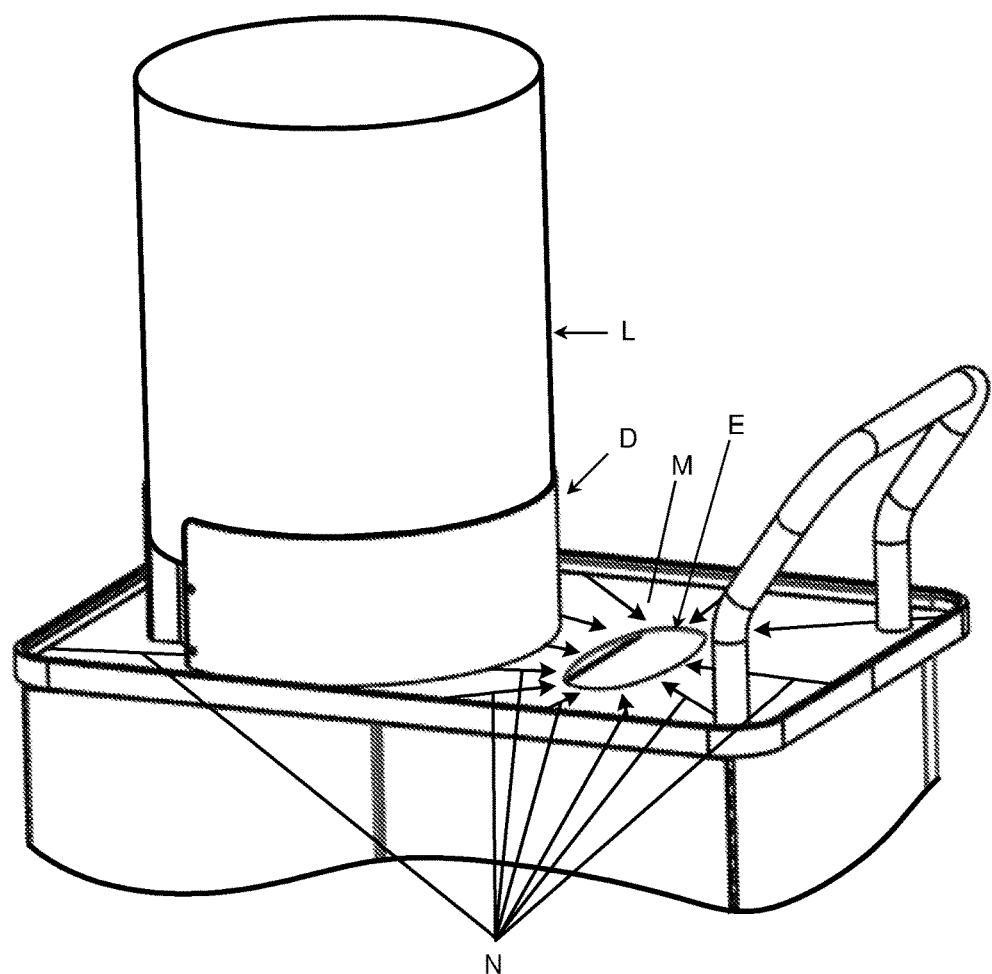
FIG. 3 shows a partial perspective view of the utility cart with a liquid container/dispenser elevated by the pedestal above the enclosed top surface.

FIG. 3 shows a partial perspective view of the utility cart with a liquid container/dispenser (L) elevated by the pedestal (D) above the enclosed top surface (M). FIG. 3 also shows the enclosed top surface (M) containing a slight slope (N). The hole (E) is at the low point of the inclined enclosed top surface (M).

Figure 4:
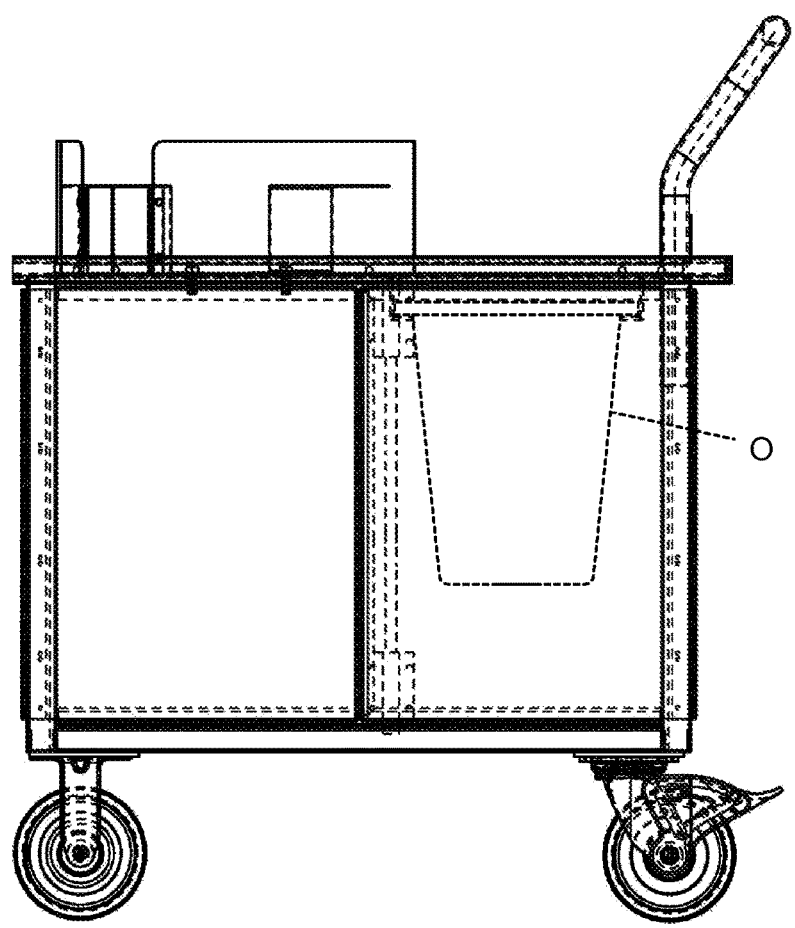
FIG. 4 shows a front view of the utility cart with a receptacle for collecting liquids and trash.

FIG. 4 shows a front view of the utility cart with a receptacle (O) for collecting liquids and trash. The receptacle (O) is placed under the hole (E). The receptacle (O) resides on flanges, rails, slides, or hinges (K) for easy removal for emptying.

A retention system for preventing spilled liquids from coming in contact with the floor may comprise: (a) a raised edge circumnavigating the top surface of the cart, the raised edge may be larger in width and length than the pedestal supporting the liquid dispenser; (b) a contoured or flat generally horizontal surface, with one or more holes for the liquid to drain through; (c) a retention device for holding a container in such a manner so as to catch spilled liquid passing through the hole in the contoured or flat surface; and (d) a raised edge circumnavigating the bottom surface of the cart, to act as a redundant retention device for any liquids passing through the previous members.

Any of the embodiments of the device can be formed or made out of plastic, metal, wood, or other material and may include both different shapes, forms, sizes or even advertising materials for brands and logos.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A hydration cart defining longitudinal, lateral, and transverse directions that are substantially orthogonal to one another, the hydration cart comprising:
    a frame comprising a top and a bottom spaced from one another in the transverse direction;
    a plurality of wheels connected to the bottom of the frame;
    a top surface connected to the top of the frame, the top surface comprising an aperture extending in the transverse direction therethrough, the top surface sloping down to the aperture;
    a pedestal extending above the top surface in the transverse direction;
    a liquid container configured to dispense liquid, the liquid container resting on top of the pedestal so as to be directly above the top surface;
    a trash container; and
    a retention device holding the trash container such that the trash container is positioned to catch liquid falling through the aperture in the top surface.

2. The hydration cart of claim 1, further comprising a raised lip circumnavigating the top surface, wherein an outer edge of the raised lip is covered with a protective material forming a bumper for the hydration cart.

3. The hydration cart of claim 1, wherein the pedestal is adjustable in diameter.

4. The hydration cart of claim 1, wherein the pedestal is adjustable in height.

5. The hydration cart of claim 4, wherein the pedestal is further adjustable in diameter.

6. The hydration cart of claim 1, wherein the container is a trash receptacle.

7. The hydration cart of claim 1, further comprising side walls connected to the frame and extending from the top of the frame to the bottom of the frame.

8. The hydration cart of claim 7, further comprising at least one locking door connected to the frame and extending from the top of the frame to the bottom of the frame.

9. The hydration cart of claim 8, wherein the top surface, bottom surface, side walls, and at least one locking door combine to form a secure area.

10. The hydration cart of claim 1, further comprising a raised lip circumnavigating the top surface.

11. A hydration cart comprising:
    an enclosure comprising a top surface, a bottom surface, and a plurality of side surfaces;
    the enclosure wherein the top surface comprises
        an outer perimeter forming a raised lip,
        an aperture extending vertically through the top surface, and
        a contour sloping down to the aperture;
    a plurality of wheels connected to the enclosure proximate the bottom surface;
    a pedestal extending above the top surface;
    a liquid container configured to dispense liquid, the liquid container resting on top of the pedestal so as to be directly above the top surface; and
    a trash container positioned inside of the enclosure to catch matter falling through the aperture in the top surface.

12. The hydration cart of claim 11, wherein an outer edge of the raised lip is covered with a protective material forming a bumper for the hydration cart.

13. The hydration cart of claim 11, wherein the enclosure is lockable.

14. A method comprising:
    obtaining a hydration cart comprising
        an enclosure comprising a top surface, a bottom surface, and a plurality of side surfaces, the top surface comprising (a) an outer perimeter forming a raised lip, (b) an aperture extending vertically through the top surface, and (c) a contour sloping down to the aperture,
        a pedestal extending above the top surface,
        a liquid dispenser resting on top of the pedestal so as to be spaced above the top surface, and
        a container positioned inside of the enclosure;
    dispensing, by the liquid dispenser, liquid onto the top surface;
    blocking, by the raised lip, the liquid from passing over the outer perimeter of the top surface;
    directing, by the contour, the liquid to the aperture; and
    falling, by the liquid, through the aperture and into the container.

15. The method of claim 14, further comprising receiving, by the container, trash passing down through the aperture in the top surface.

16. The method of claim 14, wherein at least one of the side surfaces comprising a lockable door.

17. The method of claim 16, further comprising locking the lockable door.

18. The method of claim 14, wherein an outer edge of the raised lip is covered with a protective material forming a bumper for the hydration cart.

19. The hydration cart of claim 10, wherein:
    the raised lip defines a perimeter; and
    the pedestal is located within the perimeter in both the longitudinal and lateral directions.

* * * * *